United States Patent [19]
Cier et al.

[11] 3,887,590
[45] June 3, 1975

[54] AZIDO CYCLOHEXANEPENTOL DERIVATIVE

[75] Inventors: Andre Cier, Lyon; Stephan Gero, Ablon; Alain Olesker, Marcoussis, all of France

[73] Assignee: Labaz, Paris, France

[22] Filed: July 30, 1973

[21] Appl. No.: 383,665

[30] Foreign Application Priority Data
Aug. 16, 1972 United Kingdom............... 38300/72

[52] U.S. Cl. .............................................. 260/349
[51] Int. Cl. .......................................... C07c 117/00
[58] Field of Search .................................... 260/349

[56] References Cited
UNITED STATES PATENTS
3,496,196  2/1970  Suami et al. ........................ 260/349

Primary Examiner—John M. Ford
Attorney, Agent, or Firm—Mason, Kolehmainen, Rathburn & Wyss

[57] ABSTRACT

Cyclohexanepentol derivative i.e. 1L-1-azido-1-deoxy-myo-inositol of the formula:

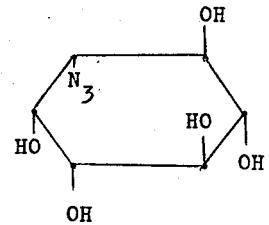

which is an intermediate product for the preparation of the known corresponding aminocyclitol.

1 Claim, No Drawings

AZIDO CYCLOHEXANEPENTOL DERIVATIVE

The present invention relates to a novel cyclohexanepentol derivative, namely 1L-1-azido-1-deoxy-myo-inositol corresponding to the formula:

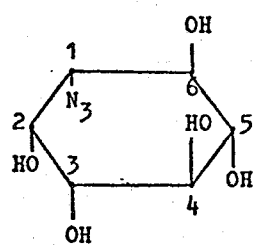

I and to a process for preparing the same.

The present invention also relates to a method of use of the new cyclohexanepentol derivative of formula I as a particularly valuable intermediate product.

The nomenclature used in the present text is that presented by I.U.P.A.C. - I.U.B. Tentative Cyclitols Nomenclature Rules, Eur. J. Biochem., 5, 1, (1968).

The cyclohexanepentol derivative of formula I may be prepared by treating in an anhydrous medium such as anhydrous methanol and at room-temperature with an alkaline alcoholate such as sodium methanolate 1L-2,3,4,5-tetra-0-acetyl-1-azido-1-deoxy-6-0-formyl-myo-inositol corresponding to the formula

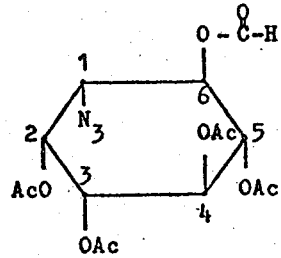

II in which the symbol Ac represents acetyl.

The starting-compound represented by formula II may be prepared by a series of known operations commencing with the known compound, 1L-3,4:5,6-di-0-cyclohexylidene-2-0-methyl-1-0-tosyl-chiro-inositol published by GERO et al. in Tetrahedron Letters pp. 591-595 (1966), and corresponding to the formula:

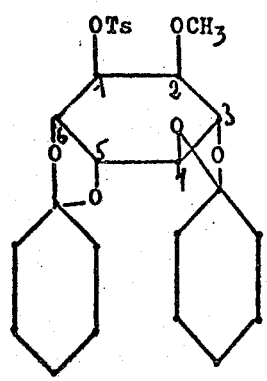

III wherein the symbol Ts represents a tosyl group, which is heated in an appropriate solvent such as, for example, N,N-dimethylformamide, with an alkaline azide such as sodium azide to give 1L-1-azido-1-deoxy-2,3:4,5-di-0-cyclohexylidene-6-0-methyl-myo-inositol of the formula:

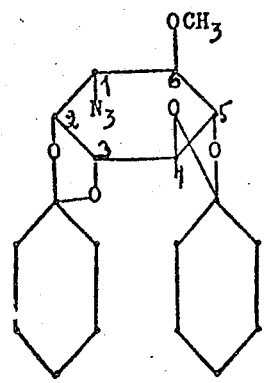

IV which is hydrolysed, for example, with hydrochloric acid to provide 1L-1-azido-1-deoxy-6-0-methyl-myo-inositol of the formula:

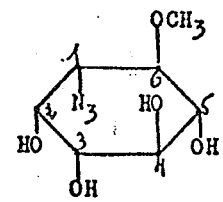

V

This latter compound may then be treated with acetic anhydride in an appropriate solvent such as, for example, pyridine to give 1L-2,3,4,5-tetra-0-acetyl-1-azido-1-deoxy-6-0-methyl-myo-inositol of the formula:

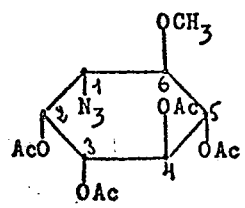

VI wherein the symbol Ac represents an acetyl group, which is oxidized with chromic anhydride at room-temperature and in an appropriate medium such as, for example, acetic acid to provide the starting-compound of formula II.

The novel cyclohexanepentol derivative of the invention constitutes a very useful intermediate compound which may be used, for example, for the preparation of the corresponding aminocyclitol and its salts. The aminocyclitol which may be obtained from the compound of formula I, namely 1D-myo-inosamine, is a known compound which is particularly useful owing to the fact that is chemical structure presents marked similarity to the natural diaminocyclitols included in the molecular composition of antibiotics of the hybromycin series.

However, 1D-myo-inosamine is not a very stable compound as it detoriates fairly quickly. It cannot, therefore, be easily stored and consequently must be prepared immediately before use.

The azide of formula I, on the other hand, which can be used for the preparation of 1D-myo-inosamine is easy to handle, very stable and can be stored for long periods of time which means that it offers the appreciable advantage of being immediately available when required without having to be prepared on every occasion when its use is indicated. Moreover, the presence of the azide group in the compound of formula I confers on this molecule a high degree of reactivity and in particular will enable subsequent reactions to be performed which would otherwise be impossible or at least very difficult.

As stated above, 1D-myo-inosamine is a known compound. It was disclosed by G.G. POST in Ph. D. Thesis, University of Wisconsin, 1959. According to the method of preparation described therein, 1D-myo-inosamine is obtained by catalytic reduction of the phenylhydrazone of 1D-myo-inosose, itself prepared by catalytic oxidation of L-inositol. However, the yield in 1D-myo-inosamine, obtained by this process is very low being about 9 to 10 %. Furthermore, the 1D-myo-inosamine so obtained contains impurities of which the major part is composed of 2L-inosamine which must be separated out by chromatography.

For these reasons, the method for preparing 1D-myo-inosamine as described in the aforesaid reference presents considerable disadvantages as regards use on the industrial scale since low yields and chromatographic separation are not acceptable at this level. This process is consequently of little practical interest.

As opposed to this, the preparation of 1D-myo-inosamine by catalytic reduction of the azide of formula I is particularly advantageous on the industrial scale as the yield in 1D-myo-inosamine by this method is practically quantitative. Furthermore, the 1D-myo-inosamine prepared in this way is devoid of impurities which obviates the need for operations of elimination which are so costly when working on the industrial scale.

Because the azide of formula I can be converted to the corresponding aminocyclitol or its salts without any difficulty and with a practically quantitative yield, this aminocyclitol may be prepared from the azide of formula I whenever required.

Thus, owing to the fact that the novel cyclohexanepentol of formula I may be easily and rapidly converted to 1D-myo-inosamine, this latter compound may be considered to be available almost as readily as if it could be prepared and stored well in advance of its use.

This is an advantage which the method described in the abovementioned Ph. D. Thesis does not offer.

The following Example illustrates the preparation of the compound of the invention:

EXAMPLE

Preparation of 1L-1-azido-1-deoxy-myo-inositol a. Preparation of 1L-1-azido-1-deoxy-2,3:4,5-di-0-cyclohexylidene-6-0-methyl-myo-inositol (Formula IV)

To a solution of 33 g of 1L-3,4:5,6-di-0-cyclohexylidene-2-0-methyl-1-0-tosyl-chiro-inositol in 220 ml of N,N-dimethylformamide were added 15 g of sodium azide. The reaction mixture was heated while being stirred at 140°C for about 12 hours and then poured into iced water. The mixture was extracted with chloroform after which the solvent was evaporated out under high vacuum. By this means, 15 g of a sticky brown-coloured product were obtained which were dissolved in a 10/90 ethyl acetate/petroleum ether mixture. The solution, so obtained, was purified by chromatography on a column of silicagel (Davison 100/200) and the solvent was evaporated out.

In this manner, 10 g of 1L-1-azido-1-deoxy-2,3:4,5-di-0-cyclohexylidene-6-0-methyl-myo-inositol were obtained, melting at 99°-101°C, after recrystallization from an ethyl acetate/petroleum ether mixture, which represents a yield of 46% in pure product.

$[\alpha]_D^{25} = +40°$ (c = 1.0, chloroform)

b. Preparation of 1L-1-azido-1-deoxy-6-0-methyl-myo-inositol (Formula V)

In 90 ml of methanol containing 7 ml of concentrated hydrochloric acid were dissolved 11 g of 1L-1-azido-1-deoxy-2,3:4,5-di-0-cyclohexylidene-6-0-methyl-myo-inositol, prepared as described hereabove. The reaction mixture was heated under reflux at 70°C for 3 hours after which the solvent was evaporated out under vacuum. The residue was take up several times with ethanol and benzene and again evaporated to eliminate the solvents and the hydrochloric acid. In this manner, 5.3 g of white crystals of 1L-1-azido-1-deoxy-6-0-methyl-myo-inositol were obtained, melting at 177°-179°C, after recrystallization from a benzene/ethanol mixture which represents a yield of 81% in pure product.

$[\alpha]_D^{25} = -29°$ (c = 1.04, methanol)

c. Preparation of 1L-2,3,4,5-tetra-0-acetyl-1-azido-1-deoxy-6-0-methyl-myo-inositol (Formula IV)

In 50 ml of pyridine were dissolved 5.3 g of 1L-1-azido-1-deoxy-6-0-methyl-myo-inositol, prepared as described hereabove. Through a dropping-funnel was added to this solution, drop-by-drop, a mixture of 21 ml of acetic anhydride and 0.6 ml of concentrated hydrochloric acid. The reaction was conducted for 12 hours then the reaction medium was poured into an iced aqueous solution of sodium bicarbonate while being magnetically stirred. The precipitate so formed was filtered out on a Büchner-funnel and washed with water to neutrality.

In this manner, 8.5 g of 1L-2,3,4,5-tetra-0-acetyl-1-azido-1-deoxy-6-0-methyl-myo-inositol were obtained, melting at 170°-173°C, after recrystallization from ethanol, which represents a yield of 91% in pure product.

$[\alpha]_D^{26} = -39°$ (c = 1.62, chloroform).

d. Preparation of 1L-2,3,4,5-tetra-0-acetyl-1-azido-1-deoxy-6-0-formyl-myo-inositol (Formula II).

To a solution of 19 g of chromic anhydride in 400 ml of glacial acetic acid, were added 8.5 g of 1L-2,3,4,5-tetra-0-acetyl-1-azido-1-deoxy-6-0-methyl-myo-inositol prepared as described hereabove. The reaction was conducted at room-temperature for 5 or 6 hours. Chloroform was added to the reaction medium which was then gently poured into a iced solution of sodium bicarbonate while being magnetically stirred. The chloroformic layer was decanted out and the aqueous phase was extracted twice with chloroform. The chloroformic phases were collected, washed with water to neutrality after which the solvent was evapored off under reduced pressure.

In this manner, 7 g of 1L-2,3,4,5-tetra-0-acetyl-1-azido-1-deoxy-6-0-formyl-myo-inositol were obtained, melting at 187°–190°C after recrystallisation from methanol which represents a yield of 79% in pure product.

$[\alpha]_D^{25} = -13.5°$ (c = 0.82, chloroform).

e. Preparation of 1L-1-azido-1-deoxy-myo-inositol (Formula I)

To a solution of 10 ml of anhydrous methanol and 0.2 ml of a normal solution of sodium methanolate, were added 3 g of 1L-2,3,4,5-tetra-0-acetyl-1-azido-1-deoxy-6-0-formyl-myo-inositol, prepared as described hereabove. The reaction was conducted at room-temperature for 5 hours after which the solvent was evaporated off under reduced pressure and the residue was taken up in absolute ethanol. The precipitate so formed was filtered out on a Büchner-funnel, washed with a small quantity of absolute ethanol and then allowed to dry in a desiccator.

In this manner, 1.2 g of 1L-1-azido-1-deoxy-myo-inositol were obtained, melting at 170°–172°C, which represents a yield of 76%.

$[\alpha]_D^{27} = -6°$ (c = 1.28, methanol)

We claim:

1. 1L-1-azido-1-deoxy-myo-inositol of the formula:

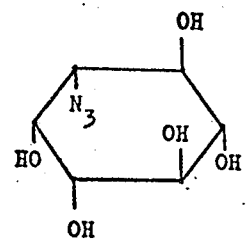

I

* * * * *